DELAY STRUCTURE

Filed Oct. 15, 1962

INVENTOR:
J. ARNAUD

BY Paul M. Craig, Jr.
ATTORNEY

United States Patent Office 3,377,572
Patented Apr. 9, 1968

3,377,572
DELAY STRUCTURE

Jacques Arnaud, Paris, France, assignor to CSF—Compagnie Generale de Telegraphie Sans Fil, Paris, France Filed Oct. 15, 1962, Ser. No. 230,384
Claims priority, application France, Oct. 24, 1961, 876,828
7 Claims. (Cl. 333—31)

The present invention relates to a wave guiding structure, and more particularly to improvements in delay line structures for hyperfrequency M-type tubes.

It is known that certain delay circuits form conduits in which the hyper-frequency energy of a given frequency may propagate simultaneously according to two modes of which the phase velocities are very different, one being the slow or delayed mode, owing to the delay properties of the circuit, and the other being the fast mode of which the phase velocity may be very close to the speed of light. This phenomenon appears particularly in circuits utilized in M-type tubes, that is, in those of which the interaction conduit is limited, on the one hand, by a geometrically periodic structure and, on the other, by a smooth parallel electrode, negative with respect to the potential of the periodic structure and generally referred to as a "sole."

This phenomenon also appears more especially in those of the delay circuits of which the periodic structure is of the bar-type. Since a coupling exists between the waves of the slow mode and of the fast mode within the regions of the discontinuities of the circuit, a portion of the energy which propagates in the slow mode and which alone is intended to be utilized, is transferred to the fast mode which is radiated by the external circuits as pure loss. It is obvious that this phenomenon, therefore, diminishes the energy output of the tube and is susceptible, in addition thereto, to disturb the proper operation based on the utilization of the slow mode.

The present invention has as its aim to avoid this inconvenience and to realize delay circuits in which the radiation of energy transferred to the fast mode is strongly diminished or practically eliminated.

According to the present invention, which relates to a delay circuit susceptible of propagating, at the same time, a slow mode and a fast mode, particularly a circuit for M-type amplifier or oscillator tubes comprising a geometrically periodic structure coupled to at least one external circuit, and a sole substantially parallel to this structure, there are provided means to reduce progressively the coupling between the structure and the sole within the region or regions adjacent to the point or points of coupling with the external circuits and going in a direction toward this point or these points.

Different means of realization of this variable coupling may be envisaged, means of which some non-limitative examples will be described more fully hereinafter.

Accordingly, it is an object of the present invention to provide a delaying structure, particularly for M-type tubes, which avoids the shortcomings of the prior art structures and substantially completely eliminates the disadvantages noted hereinabove.

Another object of the present invention resides in the provision of a delay structure, particularly for M-type tubes, which permits an effective increase in the useful energy output of the tube and at the same time assures proper operation thereof based on the utilization of the desired mode.

Still a further object of the present invention resides in the provision of a delay structure, particularly for M-type tubes, which effectively reduces or practically eliminates the energy radiation due to the transfer of energy to the fast mode.

These and other objects, features and advantages of the present invention will become more obvious from the following description when taken in connection with the accompanying drawing which shows, for purposes of illustration only, several embodiments in accordance with the present invention, and wherein FIGURE 1 is a longitudinal cross-sectional view of a first embodiment of a delay structure in accordance with the present invention;

Figures 1, 2, 3, 4, 5:
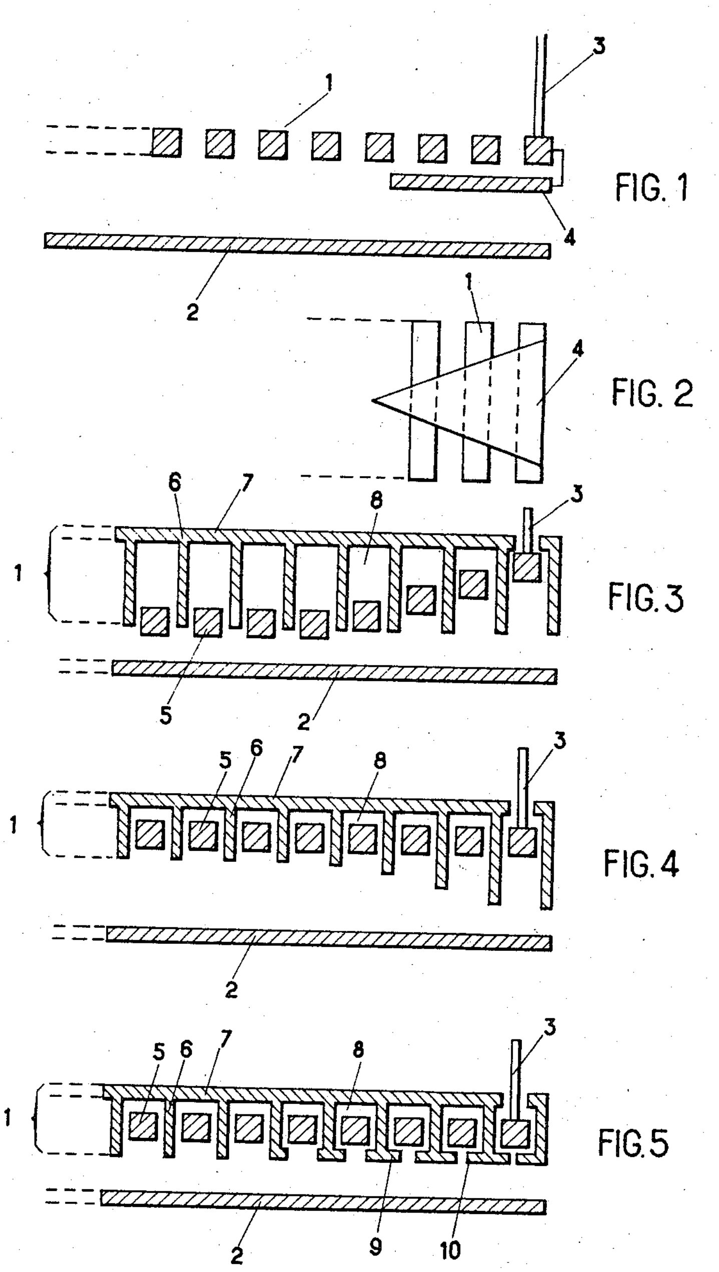
FIGURE 2 is a plan view of the delay structure shown in FIGURE 1.
FIGURE 3 is a longitudinal cross-sectional view of a second embodiment of a delay structure in accordance with the present invention.
FIGURE 4 is a longitudinal cross-sectional view of a third embodiment of a delay structure in accordance with the present invention.
FIGURE 5 is a longitudinal cross-sectional view of a fourth embodiment of a delay structure in accordance with the present invention.

The various figures of the drawing are limited to the schematic illustration of the elements of a hyper-frequency amplifier or oscillator tube essential for the present invention, a tube of which the general structure is well known, per se, as well as the detailed structure of the delay circuits.

Referring now to the drawing wherein like reference numerals are used throughout the various views to designate corresponding parts, and more particularly to FIGURES 1 and 2, reference numeral 1 designates therein the geometrically periodic structure of the delay circuit, and reference numeral 2 the sole of an M-type amplifier or oscillator tube of which the output is coupled to an external circuit by a conductor 3. According to the present invention, a plate 4 is disposed in the immediate proximity to the structure 1 between the latter and the sole 2 and within the region adjacent the coupling 3. FIGURE 2, which is a plan view from below, shows that this plate 4 has a tapered shape, for example, a triangular shape, it being understood that the rectilinear sides of the triangle could also be replaced by any other suitable shape, for example, by an exponential shape. This plate 4, which is connected to the potential of the structure 1, operates by decreasing progressively the coupling between the structure 1 and the sole 2, when one moves toward the point of coupling with the external circuit 3. Both theory and tests have shown that the passage of the energy of the fast mode across the coupling 3 is thus strongly diminished, if not completely prevented.

In FIGURE 3, in which the same reference numerals again designate the same elements as in the preceding figures, and in which there has been taken one particular example of construction of the structure 1 by alternation of bars or rungs 5 and baffles or vanes 6 fixed to the back plate 7, the means of reducing the coupling between the periodic structure and the sole in accordance with the present invention consists in disposing the bars 5 more and more deeply in the channels 8 formed between baffles 6 as one approaches the coupling 3 so that the spacing between the bars 5 and the sole increases in this direction.

In the embodiment illustrated in FIGURE 4, an equivalent means for reducing the coupling consists of increasing progressively the height of the baffles 6 in the terminal portion of the circuit, so that the spacing between the baffles and the sole decreases when moving in the direction toward the coupling 3, the bars 5 being in this case disposed at the same depth within the channels 8.

Figure 6:
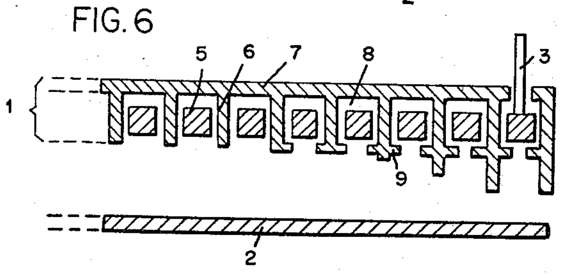
FIGURE 6 is a longitudinal cross-sectional view of a fifth embodiment of a delay structure in accordance with the present invention.

In the embodiment illustrated in FIGURE 5, another equivalent means consists in more and more closing off the channels 8 when moving in the direction toward the coupling 3, particularly by securing to the baffles 6 shields 9 provided with slots 10 more and more narrow in the direction toward the coupling 3. The depth of the arrangement of the bars 5 and the height of the baffles 6 may then remain constant, though it is also understood that combinations with the structures of the preceding FIGURES 4 and 5 can also be envisaged, such as illustrated in FIGURE 6.

The operation and the effect of each of the devices illustrated in FIGURES 3 to 6 is the same as that of FIGURES 1 and 2 explained hereinabove.

The arrangements described hereinabove may be applied to one or both extremities of the delay circuit of an M-type tube, depending on the particular needs. Even though the coupling 3 has been considered in the descriptive text hereinabove as the output of an amplifier or oscillator, the arrangements according to the present invention may also be applied to the input side of an amplifier if the need therefor exists. Additionally, the arrangements according to the present invention are applicable not only to uni-dimensional delay circuits, but also to bi-dimensional circuits without departing from the spirit and scope of the present invention.

While I have shown and described several embodiments in accordance with the present invention, it is understood that the same is not limited thereto, but is susceptible of many changes and modifications within the spirit and scope thereof, as known to a person skilled in the art. The several means described hereinabove for varying the coupling between the periodic structure and the external circuit are obviously not limitative of the present invention but admit of numerous equivalent ways as known to a person skilled in the art.

Thus, while I have shown and described several embodiments in accordance with the present invention, it is obvious that the same is not limited thereto, but is susceptible of numerous changes and modifications within the spirit and scope thereof, and I therefore do not wish to be limited to the particular details shown and described hereinabove, but intend to cover all such changes and modifications as are encompassed by the scope of the appended claims.

I claim:

1. In an M-type microwave tube having a delay circuit provided with a geometrically periodical structure including a series of periodically spaced rungs, coupling means between at least one predetermined point of said delay circuit and an external circuit, and a sole electrode located in coupled relationship with said delay circuit and being substantially devoid of delaying properties for microwave energy propagating through the tube,
the improvement essentially consisting of progressive uncoupling means positioned between said delay circuit and said sole electrode for uncoupling said delay circuit from said sole electrode along a portion of said tube including baffles provided between said rungs, said means extending substantially within an area close to said coupling point and being continuously increasingly effective in a direction approaching said point.

2. In an M-type microwave tube having a delay circuit provided with a geometrically periodical structure including a series of periodically spaced rungs, coupling means between at least one predetermined point of said delay circuit and an external circuit, and a sole electrode located in coupled relationship with said delay circuit and being substantially devoid of delaying properties for microwave energy propagating through the tube,
the improvement essentially consisting of progressive uncoupling means positioned between said delay circuit and said sole electrode for uncoupling said delay circuit from said sole electrode along a portion of said tube including baffles provided between said rungs, said means extending substantially within an area close to said coupling point and being continuously increasingly effective in a direction approaching said point,
said rungs being located increasingly more distant from said sole electrode in the spaces between adjacent baffles in the direction toward said coupling point to thereby uncouple the area of said delay circuit near said coupling point from said sole electrode.

3. In an M-type microwave tube having a delay circuit provided with a geometrically periodical structure, coupling means between at least one predetermined point of said delay circuit and an external circuit, and a sole electrode located in coupled relationship with said delay circuit and being substantially devoid of delaying properties for microwave energy propagating through the tube,
the improvement essentially consisting of a series of periodically spaced rungs and baffles between said rung in said delay circuit, and progressive uncoupling means between said delay circuit and said sole electrode, said means extending substantially within an area close to said coupling point and being increasingly effective in a direction approaching said point,
and said baffles being increasingly of greater length so as to be spaced progressively closer to said sole electrode in the direction toward said coupling point to thereby uncouple the area of said delay circuit near said coupling point from said sole electrode.

4. In an M-type microwave tube having a delay circuit provided with a geometrically periodical structure, coupling means between at least one predetermined point of said delay circuit and an external circuit, and a sole electrode located in coupled relationship with said delay circuit and being substantially devoid of delaying properties for microwave energy propagating through the tube,
the improvement essentially consisting of a series of periodically spaced rungs and baffles between said rung in said delay circuit, and progressive uncoupling means between said delay circuit and said sole electrode, said means extending substantially within an area close to said coupling point and being increasingly effective in a direction approaching said point,
and said baffles being increasingly of greater length so as to be spaced progressively closer to said sole electrode in the direction toward said coupling point while said rungs are spaced substantially equidistantly from a reference surface to thereby uncouple the area of said delay circuit near said coupling point from said sole electrode.

5. In an M-type microwave tube having a delay circuit provided with a geometrically periodical structure, coupling means between at least one predetermined point of said delay circuit and an external circuit, and a sole electrode located in coupled relationship with said delay circuit and being substantially devoid of delaying properties for microwave energy propagating through the tube,
the improvement essentially consisting of a series of periodically spaced rungs and baffles between said rung in said delay circuit, and progressive uncoupling means between said delay circuit and said sole electrode, said means extending substantially within an area close to said coupling point and being continuously increasingly effective in a direction approaching said point,
and means for partially closing the spaces between said baffles, on the side thereof facing said sole electrode, to an ever increasing extent in the direction toward said coupling point to thereby uncouple the area of said delay circuit near said coupling point from said sole electrode.

6. In an M-type microwave tube having a delay circuit provided with a geometrically periodical structure, coupling means between at least one predetermined point of said delay circuit and an external circuit, and a sole electrode located in coupled relationship with said delay circuit and being substantially devoid of delaying properties for microwave energy propagating through the tube,
the improvement essentially consisting of a series of periodically spaced rungs and baffles between said rung in said delay circuit, and progressive uncoupling means between said delay circuit and said sole electrode, said means extending substantially within an area close to said coupling point and being increasingly effective in a direction approaching said point,
and means for partially closing the spaces between said baffles, on the side thereof facing said sole electrode, to an ever increasing extent in the direction toward said coupling point to thereby uncouple the area of said delay circuit near said coupling point from said sole electrode,
said closing means including partitions substantially parallel to said sole electrode and fixed to the edges of said baffles.

7. In an M-type microwave tube having a delay circuit provided with a geometrically periodical structure, coupling means between at least one predetermined point of said delay circuit and an external circuit, and a sole electrode located in coupled relationship with said delay circuit and being substantially devoid of delaying properties for microwave energy propagating through the tube,
the improvement essentially consisting of a series of periodically spaced rungs and baffles between said rung in said delay circuit, and progressive uncoupling means between said delay circuit and said sole electrode, said means extending substantially within an area close to said coupling point and being increasingly effective in a direction approaching said point,
and said baffles being increasingly of greater length in the direction toward said coupling point to thereby uncouple the area of said delay circuit near said coupling point from said sole electrode,
and means for partially closing the spaces between said baffles, on the side thereof facing said sole electrode, to an ever increasing extent in the direction toward said coupling point to thereby uncouple the area of said delay circuit near said coupling point from said sole electrode,
said closing means including partitions substantially parallel to said sole electrode and fixed to the edges of said baffles.

References Cited

UNITED STATES PATENTS

| | | | |
|---|---|---|---|
| 2,888,595 | 5/1959 | Warnecke | 315—3.6 |
| 2,888,597 | 5/1959 | Dobler | 315—3.5 |
| 2,908,844 | 10/1959 | Quate | 333—83 |
| 2,916,656 | 12/1959 | Moats | 315—3.5 |
| 2,942,142 | 6/1960 | Dench | 315—3.5 |
| 2,945,901 | 7/1960 | Karp | 315—3.5 |
| 2,985,790 | 5/1961 | Kompfner | 315—3.5 |
| 3,121,820 | 2/1964 | Wilbur | 315—3.5 |
| 3,254,262 | 5/1966 | Hull | 333—3 |

HERMAN KARL SAALBACH, *Primary Examiner.*

C. BARAFF, *Assistant Examiner.*